May 22, 1923.
H. B. WALTON
TIRE
Filed Nov. 10, 1922
1,456,163
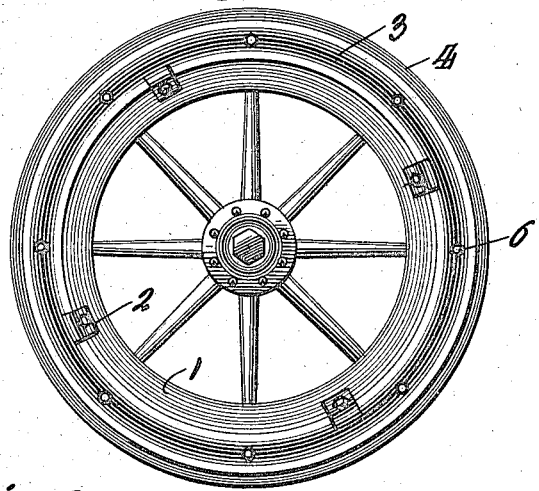
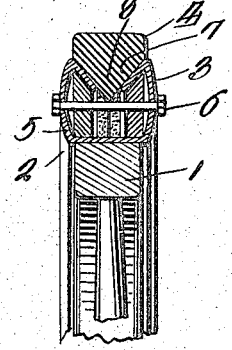
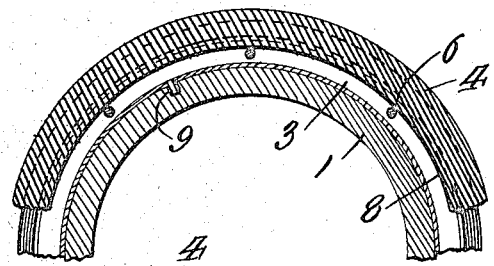
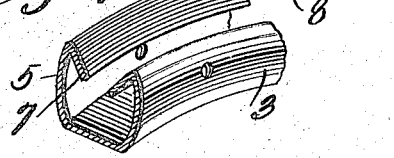
WITNESSES
Inventor
HUGH B. WALTON
By Richard B. Owen
Attorney Patented May 22, 1923.

1,456,163

UNITED STATES PATENT OFFICE.

HUGH B. WALTON, OF DEER PARK, WASHINGTON.

TIRE.

Application filed November 10, 1922. Serial No. 600,073.

*To all whom it may concern:*

Be it known that I, HUGH B. WALTON, a citizen of the United States, residing at Deer Park, in the county of Spokane and State of Washington, have invented certain new and useful Improvements in a Tire, of which the following is a specification.

The present invention relates to a tire constructed for use upon the wheels of vehicles and especially automobiles.

The principal object of the invention is to provide a tire which will be extremely durable in construction and efficient in operation.

Another important object of the invention is to provide a tire of this nature which will be capable of being manufactured at a comparatively low cost and which is provided with a tread section that may be replaced.

With the above and numerous other objects in view as will appear as the description progresses, the invention resides in certain novel features of construction, and the combination and arrangement of parts as will be hereinafter more fully described and claimed.

In the drawing—

Figure 1 is an elevation of a wheel showing my tire attached thereto,

Figure 2 is a transverse section through the tire,

Figure 3 is a longitudinal section therethrough, and

Figure 4 is a detail disassembled fragmentary perspective of the tire.

Referring to the drawing in detail it will be seen that an ordinary automobile wheel has been shown at 1 which is constructed with the usual felly upon which is mounted my tire. This tire is held in place by the cleats 2 which are supported by bolts passing through the felly such as are now commonly in use for holding a demountable rim upon the felly of the wheel. The tire comprises the main section 3 and the auxiliary or tread section 4. The main section 3 is preferably formed of metal and includes a body portion 5 U-shaped in cross section the sides of which are slightly bowed outwardly from each other as is indicated to advantage in Figure 2 and these sides are provided with registering apertures for receiving bracing bolts 6 which extend therethrough and are held in place by suitable nuts. At the upper end of the sides of the body there are provided inwardly extending depending flanges 7 which converge toward each other and terminate in spaced relation to each other. These flanges form a seat for the tread section 4.

The tread section 4 is preferably a solid rubber tire comprising a body portion having on its inner surface the extension 8 which is constructed with side walls that converge toward each other and fit on the flanges 7.

As is disclosed in Figure 3 I prefer to provide the felly of the wheel 1 with an indenture for receiving a lug or pin 9 extending from the bottom of the U-shaped body of the main section 3 thereby preventing longitudinal movement of the tire in relation to the felly. This is especially important upon the drive wheels.

Although I have described my invention with a certain degree of particularity it is to be understood that the construction which I have disclosed has been given merely by way of example and numerous changes in the details of construction and the combination and arrangement of parts may be resorted to without departing from the spirit of the invention as hereinafter claimed.

Having thus described my invention what I claim as new is:—

1. A tire of the class described including a main section and an auxiliary section, said main section being the inner section and formed of resilient material and constructed so as to provide a body U-shaped in cross section having inwardly extending flanges on its edges for forming a seat for the auxiliary section, and a plurality of bolts bracing the side portions of the body in relation to each other.

2. A tire of the class described including a main section, an auxiliary section mounted on the main section, said main section comprising a body U-shaped in cross section having the sides thereof bowed outwardly from each other and provided at its edges with inwardly extending flanges that converge toward each other for forming a seat for the auxiliary section, and a plurality of bolts extending between the bowed sides of the body for bracing these sides in relation to each other.

In testimony whereof I affix my signature in presence of two witnesses.

HUGH B. WALTON.

Witnesses:
CLEO O. KNOWLTON,
O. L. OLSEN.